United States Patent [19]
Concha et al.

[11] Patent Number: 4,884,271
[45] Date of Patent: Nov. 28, 1989

[54] ERROR CHECKING AND CORRECTING FOR READ-MODIFIED-WRITE OPERATIONS

[75] Inventors: Fernando Concha; Charles J. Stancil, both of Boca Raton, Fla.

[73] Assignee: International Business Machines Corporation, Armonk, N.Y.

[21] Appl. No.: 138,429

[22] Filed: Dec. 28, 1987

[51] Int. Cl.[4] .......................................... G06F 11/00
[52] U.S. Cl. ................................................. 371/40.2
[58] Field of Search ..................... 371/37, 38, 39, 40, 371/13; 364/200 MS File, 900 MS File

[56] References Cited

U.S. PATENT DOCUMENTS

| | | | |
|---|---|---|---|
| 3,814,921 | 6/1974 | Nibby | 371/38 |
| 4,072,853 | 2/1978 | Barlow | 371/38 |
| 4,077,565 | 3/1978 | Nibby | 371/38 |
| 4,249,253 | 2/1981 | Gentili | 371/38 |
| 4,317,201 | 2/1982 | Sedalis | 371/38 |
| 4,319,356 | 3/1982 | Kocol | 371/38 |
| 4,646,304 | 2/1987 | Fossati | 371/13 X |

OTHER PUBLICATIONS

Purge Your Memory Array of Pesky Error Bits, EDN Magazine—May 20, 1980, pp. 153-158.

*Primary Examiner*—Jerry Smith
*Assistant Examiner*—Robert W. Beausoliel

[57] ABSTRACT

Error detection and correction logic is interposed between a 16-bit CPU and a data storage unit with a 32-bit word size and single bit error correction and double bit error detection (ECC) code bits. During each CPU Read cycle, a full word and its ECC bits are read from storage; and a selected 16 data bits are transferred to the CPU directly if they are error free or are corrected by the ECC logic and then transferred if they have only one bit with an error. During each CPU Write cycle, a selected full word and its ECC bits are read from storage; 16 data bits of the word are replaced by 16 data bits from the CPU; ECC bits are calculated for the modified word; and the modified word and its ECC bits are entered into the storage unit so long as no error exists in the remaining 16 bits of the data word which were not replaced/modified. This type of operation is often referred to as a Read-Modify-Write (RMW) cycle. During this RMW operation, the ECC logic detects and corrects a single bit error (if one exists) concurrent with modification of the word and calculation of new ECC bits. The corrected word is then modified by the data bits from the CPU, new ECC bits are calculated and the latter modified word and ECC bits are entered into the storage unit rather than the former word which contained a single bit error. If no error exists, a short RMW cycle is used; if a single bit error exists a longer RMW cycle is used.

4 Claims, 4 Drawing Sheets

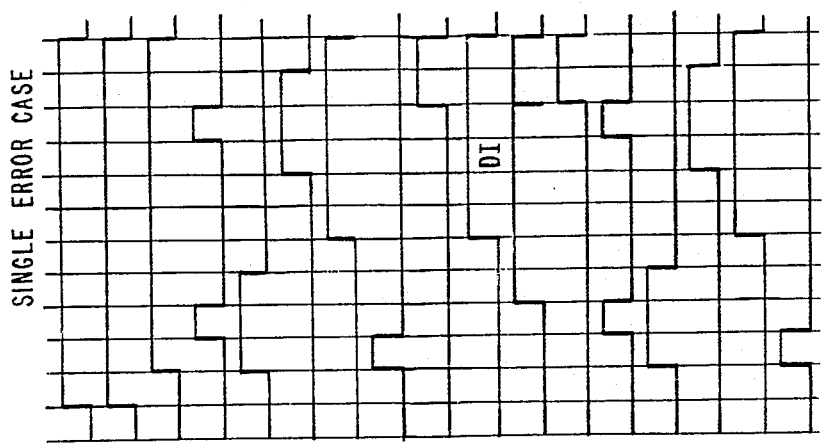
FIG. 4 SINGLE ERROR CASE
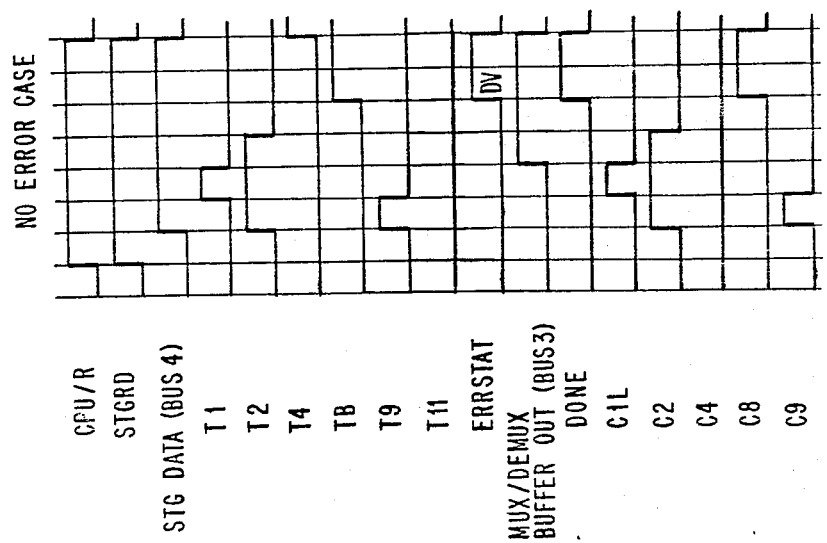
FIG. 3 NO ERROR CASE
STORAGE READ TIMING

SINGLE ERROR CASE

NO ERROR CASE

STORAGE READ-MODIFY-WRITE TIMING

CPU/W
CPU DATA
STGRD
STG DATA (BUS 25)
T0
T3
T6
T7
T8
T9
T10
MUX/DEMUX BUFFER OUT
ERRSTAT
DATA & CBS (BUS 4)
STGWR
DONE
C1L
C3
C6
C7
C8
C9

ERROR CHECKING AND CORRECTING FOR READ-MODIFIED-WRITE OPERATIONS

BACKGROUND OF THE INVENTION

The present invention relates to an improved method and means for transferring data of a partial word size from a central processing unit (CPU) to a main storage unit having data stored in a larger, full word size with single bit error correction (ECC) code bits appended thereto. Such systems employ a Read-Modify-Write (RMW) type of operation characterized by first reading a selected full word from storage, replacing corresponding bits of the full word with the partial word bits transferred from the CPU, and writing the modified full word back into storage. When error correction is provided in such systems, the selected full word is checked for errors and corrected if a single bit error exists; then the corrected word is modified by the CPU bits, new ECC bits are generated and the corrected, modified word and ECC bits are written into storage.

The sequential steps of checking and correcting errors prior to modifying the selected full word significantly reduces system performance.

Various tradeoffs in this system environment are discussed in detail at page 157 of the article "Purge Your Memory Array of Pesky Error Bits" by R. Korody and D. Roaum appearing in EDN May 20, 1980 at pages 153-158. This article also includes a detailed discussion of error detection and correction circuits based upon Hamming code principles. However no satisfactory solution is offered relative to the system inefficiency caused by the sequential steps discussed above.

One approach is to perform the ECC on the smaller, CPU partial word size and to write partial words to storage (if the storage system permits) rather than full words; but this results in a more costly storage system since more check bits are required.

SUMMARY OF THE INVENTION

The present improvement significantly enhances the system efficiency during the RMW operations. It is based on the premise that, with today's technology, data retrieved from main storage is substantially error free, e. g. 99%. If the inefficiency of the sequential steps described above can be limited to those RMW operations in which the retrieved data has a single bit error, then overall system performance will be enhanced. Further enhancement is achieved if the sequential steps are eliminated when the single bit error exists in the ECC bits or in those bits which will be modified/replaced by the CPU bits.

These enhancements are achieved by RMW operations which work as follows:

1. Read a full data word and its check bits from storage;
2. Initiate correction of any single bit error in the data while simultaneously modifying the storage data (assumed error-free) with the CPU data and generating new ECC check bits;
3. Write this modified data word and the new check bits back into storage if there were no errors in the unmodified data or alternatively combine the CPU data with the corrected storage data, generate new check bits, and then write back to storage if there was a single bit error.

The CPU Read cycle is also enhanced by providing a "fast path" for the data read from storage to a CPU buffer in the event that the storage word is error free. If the storage word contains a single bit error, hardware detects and corrects the error and passes the corrected word to the buffer.

BRIEF DESCRIPTION OF THE DRAWING

The above and other features and advantages of the present improvement will be apparent from the following description of a preferred embodiment when read in conjunction with the accompanying drawings in which

FIGS. 3 and 4 are CPU Read timing diagrams respectively for error free and single bit error conditions.

DETAILED DESCRIPTION

Figure 1:
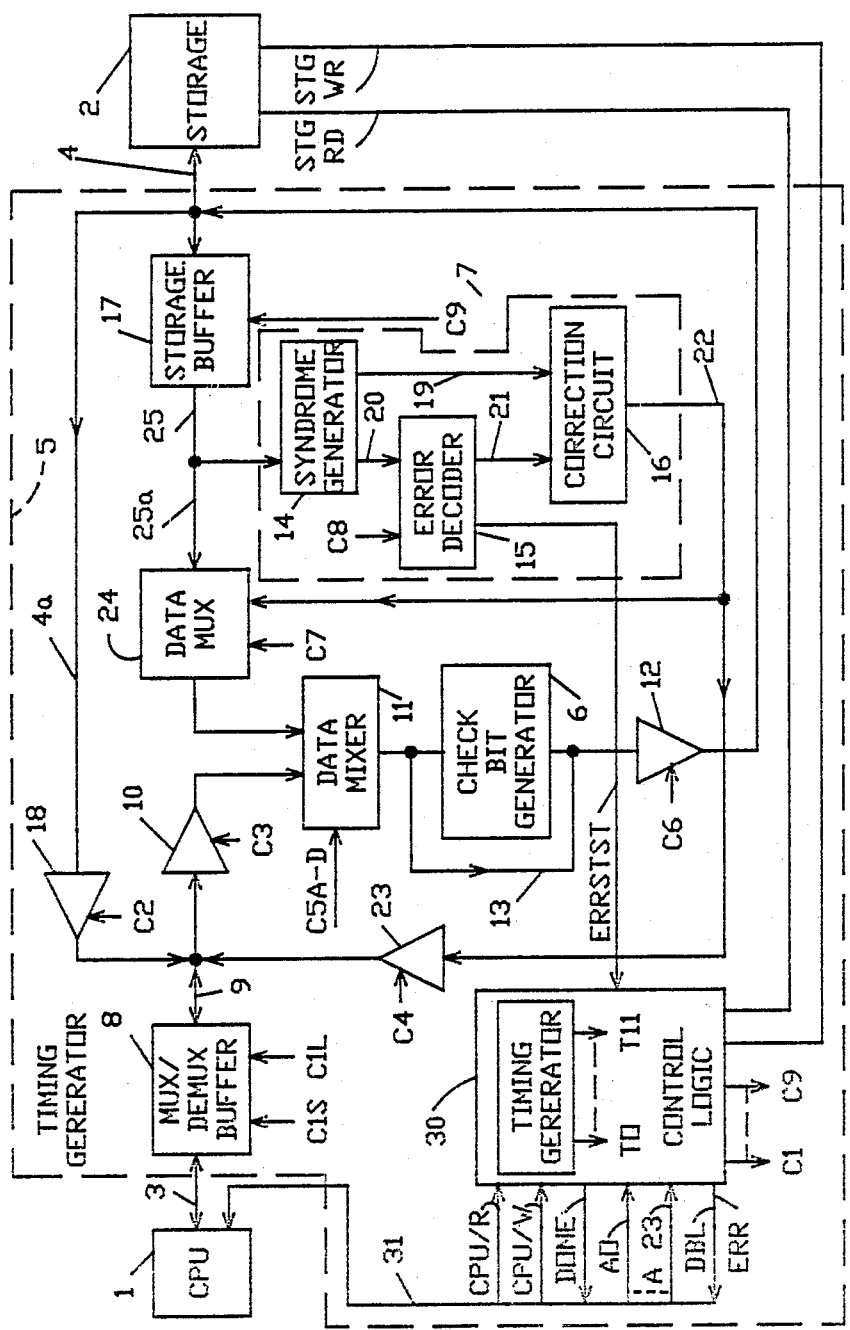
FIG. 1 is a block diagram of a system incorporating the present improvement.

FIG. 1 illustrates diagrammatically a data processing system having a CPU 1 coupled to a random access storage unit 2 via CPU data bus 3, storage data bus 4, and storage controls 5 which include an ECC bit generator 6 and ECC detection and correction logic 7. Check bit generator 6 generates parity bits on data to be written into storage. It can use any type of Hamming-code based algorithm which provides single error correction as a minimum. In the preferred embodiment, six bits are required for single error correction and one additional bit is used for double error detection in a 32-bit word size storage.

A multiplexing/demultiplexing buffer 8 latches data transferred to and from CPU 1 during CPU Read and RMW operations, and it controls data transfer between a 16-bit CPU path (bus 3) and a 32-bit storage path (bus 4). Buffer 8 is coupled to storage 2 via bus 9, driver 10, a data mixer 11, generator 6, bus 13, driver 12 and bus 4. In the preferred embodiment, data mixer 11 forms a full 32-bit word from data (16 bits) sent by CPU 1 and data (16 of 32 bits) read from storage 2 during RMW operations.

Storage 2 is coupled to buffer 8 via a fast path 4a of bus 4, driver 18 and bus 9 during CPU Read cycles when no data error occurs.

A buffer 17 stores data and ECC bits read from storage 2 during both CPU Read and RMW operations. This data and the ECC bits are coupled to a syndrome generator 14, an error decoder 15 and a single bit error correction circuit 16 which may be generally of the type described in the above-mentioned EDN article.

Generator 14 passes the data bits to the circuit 16 via bus 19. Syndrome generator 14 also generates a set of check bits based upon the data read from storage and compares them with the ECC check bits read from storage 2. This yields a unique code word (syndrome) which can identify a single bit in error. This syndrome word appears on bus 20 and points to any single bit error in the data or ECC bits.

Decoder 15 decodes the syndrome. If a single bit data error exists, it generates a signal on that line in bus 21 which corresponds to the data bit position in error; and the generated signal causes circuit 16 to invert the bit in error. All other data bits pass through circuit 16 unchanged.

Decoder 15 also produces output status bits on bus ERRSTAT to indicate no error occurred (data valid DV), a single bit error occurred (data invalid DI) in the ECC bits or in bytes one, two, three or four of the data, or a double error occurred. If a single bit error is found in one of the check bits or in a data bit in one of the half-words to be over-written by CPU data (insignificant error) during RMW operations, then no correction is required in the preferred embodiment.

During CPU Read operations, when a single data bit error is detected, the corrected data from circuit 16 is transferred to buffer 8 via bus 22, driver 23 and bus 9.

During RMW operations, a data multiplexor 24 selects either raw data from storage or corrected data. Selection is based upon validity of raw storage data. Thus the data path 25a of bus 25 couples the output of buffer 17 to multiplexor 24, and the bus 22 couples the output of correction circuit 16 to multiplexor 24. The output of multiplexor 24 is coupled to data mixer 11.

Conventional timing and control logic 30 is provided for data transfers during CPU Read operations and RMW operations. The error status bus ERRSTAT from decoder 15 is coupled to inputs of logic 30. Timing and control bus 31 from the CPU 1 is also coupled to logic 30. Outputs C1S to C9 inclusive from logic 30, control the various steps in the data transfer operations.

Figure 2:
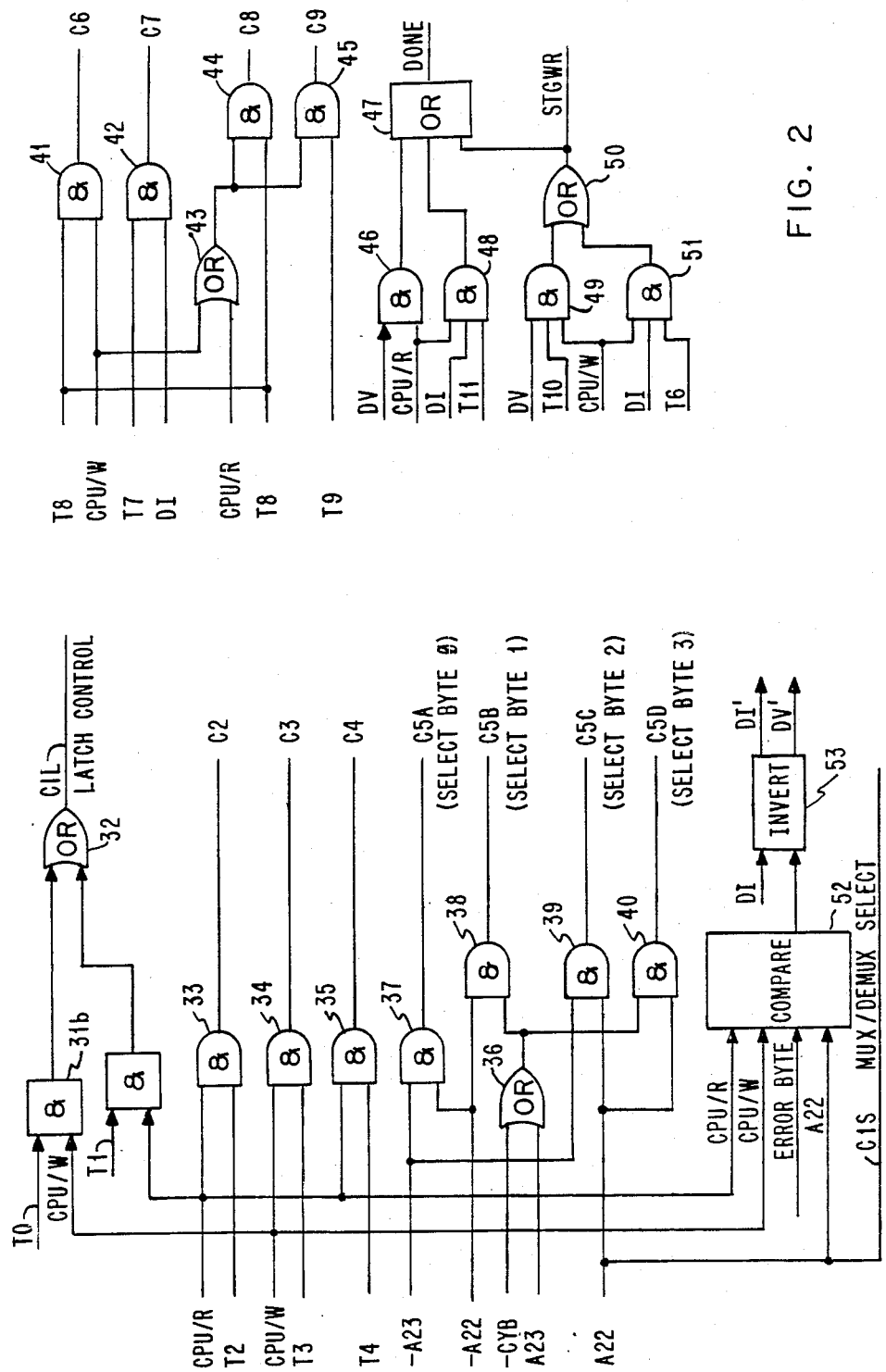
FIG. 2 illustrates certain logic circuits which are used for timing and control.

Reference is directed to FIG. 2 which illustrates schematically certain of the logic circuits in timing and controls logic 30 which produce inputs (C1S to C9 inclusive) to various elements of FIG. 1. In addition, timing diagrams FIGS. 3-6 illustrate the timing and control input and output signals of the logic of FIG. 2.

Thus input C1S to buffer 8 is coupled to the next to lowest order bit A22 of the address bus portion of bus 31 to select the two low order or two high order bytes of a four byte word in buffer 8 for data transfers to and from the CPU 1 during Read and RWM operations.

Input C1L to buffer 8 is energized via AND gates 31a, 31b and OR gate 3Z during both Read and RMW operations at times T1, and T0 respectively.

Input C2 to driver 18 is energized via AND gate 33 at time T2 only during a CPU Read operation when line CPU/R comes up, FIGS. 3 and 4.

Figure 6:
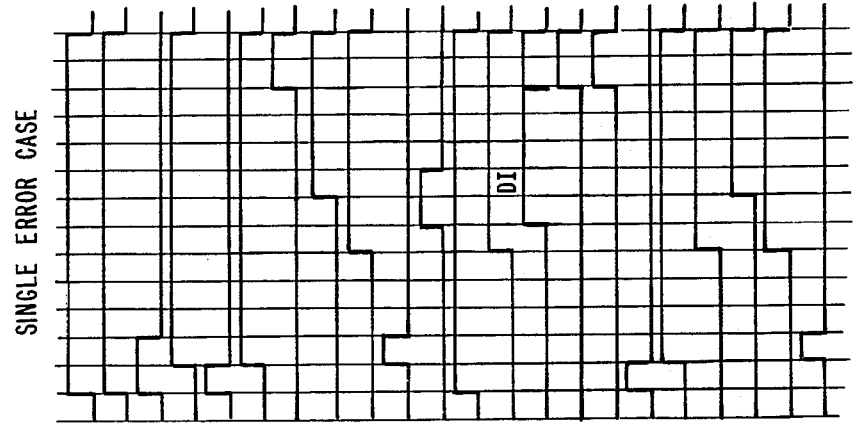
FIGS. 5 and 6 are RMW timing diagrams for error free and single bit error conditions respectively.
Figure 5:
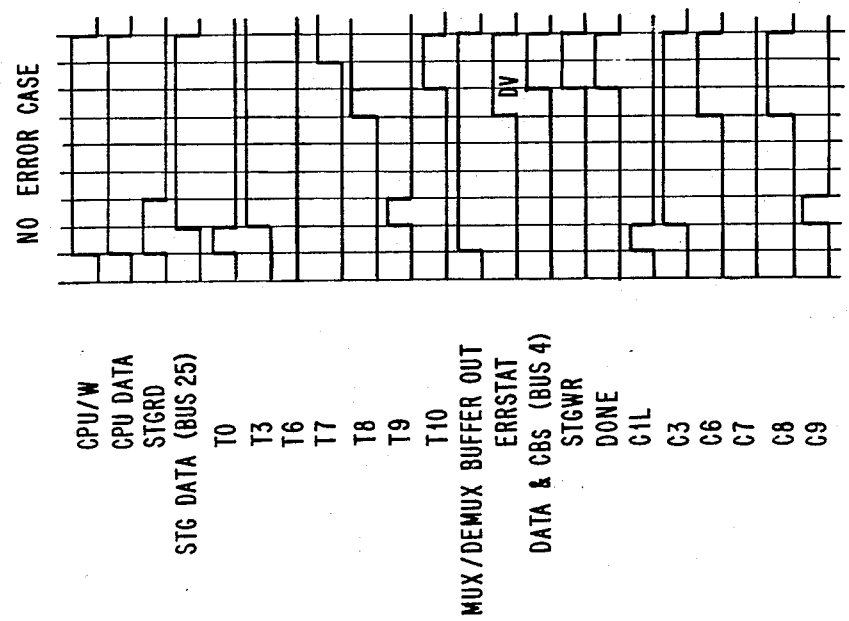

Input C3 to driver 10 is energized via AND gate 34 during time T3 as long as line CPU/W is up during RMW operations, FIGS. 5 and 6.

Input C4 to driver 23 is energized at time T4 during a CPU Read operation when a single bit error exists and must be corrected, that is when the CPU/R time is extended.

Low order address bits A22, A23, -A22, -A23 determine via OR gate 36 and AND gates 37-40 which two bytes of the CPU data from buffer 8 and which two bytes of the storage data from data multiplexor 24 are combined to form a new four byte word for transfer to storage 2. These lines thus produce inputs 5A to 5D which are energized during the entire RMW operation.

A signal on line -CYB can be used if it is desirable to transfer one or three bytes from the CPU.

Input C6 to driver 12 is energized via AND gate 41 during time T8 while the line CPU/W is up during RMW operations.

Input C7 to data multiplexor 24 is normally in a state which passes data from buffer 17 to data mixer 11 during each RMW operation, and its state is changed via AND gate 42 during time T7 when a data invalid signal DI on ERRSTAT bus is produced by decoder 15 to signify a single bit error. In its changed state, C7 causes corrected data from circuit 16 to be passed to data mixer 11 via the multiplexor 24.

Input C8 to error decoder 15 is effective, via OR gate 43 and AND gate 44 during time T8 while the CPU/R or CPU/W lines are up during CPU Read and RMW operations, to cause decoder 15 to initiate the appropriate output signals on bus ERRSTAT.

Input C9 to buffer 17 is energized via OR gate 43 AND gate 45 t time T9 during CPU Read and RMW operations with line CPU/R or CPU/W up.

A CPU Read operation with no data error will now be described in detail, reference being directed to FIGS. 1, 2 and 3. The CPU/R line comes up and brings up the STGRD line to initiate reading of data and ECC bits from a location in storage determined by address lines A0–A23 in bus 31. Storage data and ECC bits become available on bus 4 and its data bus portion 4a. The signal on C9 gates the data and ECC bits into buffer 17 and the signal on C2 gates the data only to bus 9 via drivers 18. The signal on line C1L latches up the data in buffer 8, and the data is now available for the CPU 1 as illustrated in FIG. 3 on line MOX/DEMUX buffer out.

If at time T8, the error status line DV of bus ERRSTAT from decoder 15 indicates that the data in buffer 17 is valid, the DONE line in controls 30 is energized via AND gate 46 and OR gate 47 (1) to send a signal over bus 31 to the CPU 1 to initiate reading of two bytes of the data in buffer 8 as determined by C1S and (2) to terminate the CPU/R signal initiates the termination of which the Read operation.

However, if at time T8 the error status lines indicate that the data in buffer 17 is invalid with a single bit error, energization of the DONE line is inhibited at time T8 (FIG. 4) by the data invalid signal DI (rather than DV) on the ERRSTAT bus. At time T4, the gating signal on line C4 passes the corrected data from circuit 16 to bus 9 via drivers 23; and the signal on line C1L at T1 time (second occurrence, FIG. 4) gates the corrected data into buffer 8, thus overwriting the erroneous data.

The DONE line is energized via gates 48 and 47 by the signals on lines T11, DI and CPU/R to initiate the reading of the corrected data from buffer 8 to the CPU 1 and the termination of the READ operation.

An RMW operation with no data error will now be described, reference being directed to FIGS. 1, 2 and 5. The CPU/W line (FIG. 5) comes up at time to and brings up the STGRD line to initiate reading of data and ECC bits from a location in storage 2 determined by address lines A0–A23 in bus 31. A signal on line C1L gates two bytes of data from the CPU 1 into word buffer 8 as determined by the signal on A22; the other two bytes in buffer 8 are driven to "0"s. At time T9, the signal on line C9 gates the storage data and (STG Data) ECC bits into buffer 17 via bus 25a, so that it is available on bus 25 and its data portion 25a to data mixer 11. The multiplexor 24 passes the data from buffer 17 via bus 25a, to data mixer 11. At time T3, line C3 comes up to cause driver 10 to pass CPU data from buffer 8 via bus 9, into data mixer 11. Inputs C5A–D cause the data mixer 11 to properly combine the data from buffers 8 and 17 (e.g., two bytes from each from each buffer) to form a new four byte data word, and generator 6 creates ECC bits for the new data word. At time T8, the signal on line C6 causes drivers 12 to place the new data word and its ECC bits on bus 4.

Assuming no error exists, signals on lines DV, T10 and CPU/W energize the DONE and storage write STGWR lines via AND gate 49 and OR gates 50 and 47. The signal on STGWR causes the new data word and its ECC bits to be written back into the location in storage from which data was just read. The DONE line signal initiates termination of the RMW operation.

If however at time T10, a single bit error signal appears on line DI of the ERRSTAT bus (i.e. gated at T8 time by a signal on line C8), the signals on lines STGWR and DONE are delayed until T6 time. At time T7 (during the delay), a signal on line C7 causes multiplexor 24 to couple the corrected data word from circuit 16 to the data mixer 11. The corrected word is modified by the CPU data, which is still coupled to mixer 11, and ECC bits are formed by generator 6 for the modified, corrected word. The signal on C6 is still up and causes drivers 12 to place the modified, corrected word and its ECC bits on bus 4.

At time T6 (FIG. 6), the lines STGWR and DONE energized by lines CPU/W, DI, and T6 via gates 51, 50 and 47 to write the modified, corrected word and its ECC bits into storage 2 and to initiate the termination of the RMW operation. It has been assumed in the above description that all errors in data /ECC bits read from storage require the longer READ and RMW operation cycles of FIGS. 4 and 6.

Since error decoders such as 15 have logic which determines the location of the error, no data invalid signal DI will be produced if the single bit error is within the ECC bits. Rather a data valid signal DV is produced.

If the single bit error exists within the four bytes of data read from storage 2, the position of the error (within bytes 0, 1 or 2, 3) can be compared in logic circuit 52 with the signal on line A22 which indicates which two bytes (0, 1, or 2, 3) are received from the CPU 1 during RMW operations or which are sent to the CPU 1 during read operations.

If during a CPU Read Operation, the error in the storage data is in the two bytes not called for by line A22, the circuit 52 causes inverter 53 to invert a DI signal from decoder 15 to produce a signal on line DV rather than DI. The operation as set forth in FIG. 3 is then completed.

If during a CPU RMW operation, the single bit error in the storage data is in the two bytes which will be replaced by the CPU data as determined by the signal on line A22, the circuit 52 causes inverter 53 to invert the DI signal to produce a signal on line DV rather than DI'. The operation as illustrated in FIG. 5 is then completed using signals on lines DV' and DI' instead of DV and DI.

If a double bit error occurs, the operation is terminated and the CPU takes appropriate action in response to the signal on line DBL ERR of bus 31 (FIG. 1).

It has been assumed in the above description that the storage speed relative to that of the ECC checking logic permits writing only after checking. However, certain storage systems such as dynamic ram with page mode capabilities, reduced cycle, (DRAM) and static ram (SRAM) are so fast relative to ECC checking that is possible to execute two writes to storage, once with data that may have a single bit error and subsequently with the corrected data of such an error exists. The first write is completed prior to the ECC checking function; and, if no error exits, the write cycle can be terminated at T8 time in FIG. 5.

Other changes in and modifications to the preferred embodiments of the present invention may be made and the appended claims are intended to cover all such changes and modifications as fall within the true scope and spirit of the invention.

What is claimed is:

1. In a data processing system including a data storage module having a plurality of addressable locations for storing in each said location a digital information segment and an error checking and correcting code (ECC) for said segment and including a processor operating upon information in units smaller than said segment, said system further including read-modify-write (RMW) means for combining a portion of a selected segment with an information unit from the processor to form a new segment and its ECC for transfer to the storage module, the method of transferring information units from the processor to the storage module comprising the steps of concurrently
   (a) combining a portion of a selected first segment from one of said locations with an information unit from the processor to form a second segment and generating ECC bits for said second segment, and
   (b) writing said second segment to said one location;

(c) determining whether the selected first segment is error free or contains a single bit error;

correcting the selected first segment, if it contains a single bit error, to form a third segment; combining a portion of the corrected third segment with the information unit from the processor to form a fourth segment and generating ECC bits for said fourth segment; and rewriting the fourth segment in place of said second segment in said one location.

2. The method of claim 1 further comprising the steps of determining whether the single bit error lies in or out of said portion of the selected first segment, and maintaining the second segment and its ECC bits rather than the fourth segment in said one location if the single bit error lies out of said portion.

3. In a data processing system including a data storage module having a plurality of addressable locations for storing in each said location a digital information segment and an error checking and correcting code for said segment and including a processor operating upon information in units smaller than said segment, said system further including read-modify-write (RMW) apparatus including means for reading a selected segment and its ECC from one location, means for combining a portion of the selected segment with an information unit from the processor to form a new segment and for generating an ECC for the new segment for subsequent transfer of the new segment and its ECC into said one location, the improvement comprising in combination with the processor, the storage module and the RMW apparatus;

error checking and correcting means coupled to the reading means for receiving the selected segment and its ECC read from the storage module and including first means for determining whether or not the segment is error free or has a single bit error and second means for correcting single bit errors in the segment, control means rendering the determining means effective concurrent with the forming of the new segment and its ECC by the combining and generating means, means effective upon determination of the error free condition of the selected segment for transferring the new segment and its ECC to said one location, means effective upon a determination of a single bit error for transferring the corrected segment to the combining and generating means to form a corrected new segment and its ECC, means thereafter effective for transferring the corrected new segment and its ECC to said one location;

a multiplexing/demultiplexing means connected to the processor, apparatus for reading a selected segment and its ECC from one location, means gating the last selected segment directly to the multiplexing/demultiplexing means, said error checking and correcting means determining concurrently with gating of the last segment to the multiplexing/demultiplexing means whether or not the latter segment contains a single bit error, and correcting a single bit error in the latter segment if one exists, means gating the latter corrected segment to the multiplexing/demultiplexing means, and means for providing for the use of the corrected segment by the processor if a single bit error exists in the first selected segment.

4. The system of claim 3 further comprising means determining whether the position of the single bit error lies in or out of said portion of the selected segment, and means effective if the single bit error lies out of said portion for transferring said new segment and its ECC rather than the corrected new segment to said one location.

* * * * *